United States Patent [19]
Luich

[11] 3,795,148
[45] Mar. 5, 1974

[54] PRESSURE VENTING INSTRUMENT CASING ASSEMBLY

[75] Inventor: Ronald Joseph Luich, Bridgeport, Conn.

[73] Assignee: Dresser Industries, Inc., Dallas, Tex.

[22] Filed: Jan. 23, 1973

[21] Appl. No.: 325,986

[52] U.S. Cl. .................................... 73/431, 73/416
[51] Int. Cl. .......................... G01p 1/02, G01l 7/04
[58] Field of Search ............. 73/416, 431, 273, 274; 116/DIG. 27; 220/44 R

[56] References Cited
UNITED STATES PATENTS
3,298,557   1/1967   Ingham ................................. 73/416
3,630,089   12/1971  Bissell .................................. 73/431

Primary Examiner—Donald O. Woodiel
Attorney, Agent, or Firm—Daniel Rubin

[57] ABSTRACT

An instrument casing assembly for pressure gauges and the like providing controlled venting to atmosphere in the event of internal overpressure buildup. A cylindrical cup-shaped window or crystal representing the front side is received axially inter-fitting within the open face of a cup-shaped casing representing the rear side. Axially positioned between opposing surfaces of the window and casing is a resilient gasket by which a seal can be effected thereat. For maintaining the seal there is provided an annular collar ring resiliently biasing the window and casing axially toward each other and against the gasket. In the event of an internal overpressure buildup, increasing pressure acting against the inside window surface forces separation thereof from the gasket in opposition to the biasing force of the collar.

10 Claims, 4 Drawing Figures

PATENTED MAR 5 1974 3,795,148

PRESSURE VENTING INSTRUMENT CASING ASSEMBLY

BACKGROUND OF THE INVENTION

1. The field of art to which the invention pertains includes the art of instrument casing constructions adapted for venting of internal overpressure.

2. Instruments for the measuring and/or controlling of space conditions such as temperature or pressure are commonly subject to wide variations of internal pressures as the function of the system conditions to which it is intended to respond. Typically, a pressure gauge employs a Bourdon tube operably movable in response to pressure changes and in which internal pressure received from the system being sensed is normally contained. Should the Bourdon tube incur inservice failure in the form of a pressure leak, system pressure intended to be contained can quickly fill and even explode the case or crystal. Since such a possibility represents a safety hazard to equipment and personnel in the area, it is common to provide a form of venting to prevent buildup and avoid flying fragments from an explosion which could otherwise result. Venting structures of various forms for gauge cases and the like are well known and are in wide commercial use as exemplified by U.S. Pat. Nos. 2,833,149; 3,298,557; 3,388,601; 3,434,330 and 3,630,089.

Because of the wide and extensive commercial use of such instruments, they are marketed by many manufacturers with a high order of price competition. Consequently, each gauge manufacturer constantly strives for minimal product cost frequently achieved by designs and production techniques which result in substantial savings in labor and/or materials. While venting structures of the aforementioned patents have themselves functioned well for the instruments for which they have been employed, cost reduction in the venting structure itself or an improved vent structure designed to accommodate in otherwise cost-reduced instruments, can contribute substantially to the commercial success of the article of which it is a part. At the same time, a minimal standard of quality and operability is dictated by the frequent need for approval from Underwriters' Laboratories prior to marketing.

Most recently, in order for their approval to be granted, Underwriters' Laboratories has imposed increasingly severe test criteria as compared to previous such tests. A consequence of this change has been to render many existing venting structures currently unsuitable for various reasons, including required dimensional stability at higher temperatures. At the higher temperatures on the order of 250°F., frequently employed plastic compositions such as cellulose acetate butyrate are deleteriously affected and therefore become unsuitable. Contra, thermoplastics such as polycarbonate otherwise having high temperature stability are also characterized by greater strength and less flexibility on which prior constructions relied rendering them generally unsuitable in former constructions for meeting current standards.

SUMMARY OF THE INVENTION

The invention relates to a novel instrument casing assembly providing for venting of internal overpressure. More specifically, the invention relates to an instrument casing assembly having a highly effective vent structure employable in mass produced, small diameter gauges on the order of 1-inch face diameters of a type commonly used in association with fire extinguishers. Not only does the casing assembly in accordance herewith economically achieve the desired venting feature, but its structure is at the same time characterized by physical properties able to meet current standards of Underwriters' Laboratories.

It is therefore an object of the invention to provide a novel and improved casing assembly capable of venting internal overpressure from within the casing.

It is a further object of the invention to provide a novel and improved venting structure for a gauge assembly otherwise constructed as a waterproof and dustproof enclosure.

It is a further object of the invention to effect the aforementioned objects with casing components at least partially of generally inflexible thermoplastic composition characterized by relatively high temperature dimensional stability as compared to thermoplastics compositions similarly employed for these purposes in the prior art.

It is a still further object of the invention to provide a novel venting structure for an instrument casing as in the last mentioned object that is highly effective yet capable of use with small gauge diameters at very minimal production cost.

Figure 1:
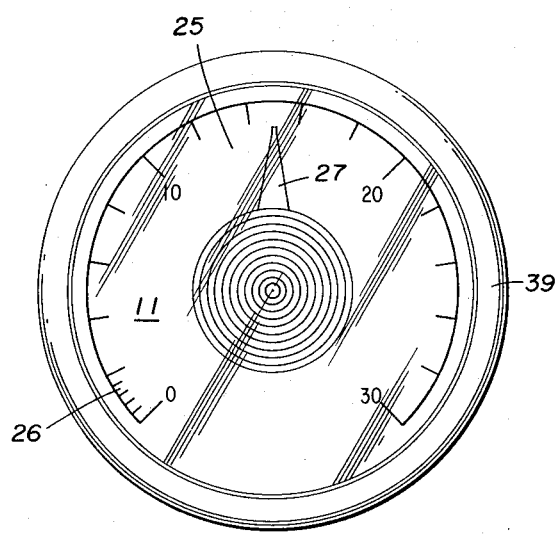
FIG. 1 is a front face view of a pressure gauge instrument constructed in accordance herewith.
Figure 2:
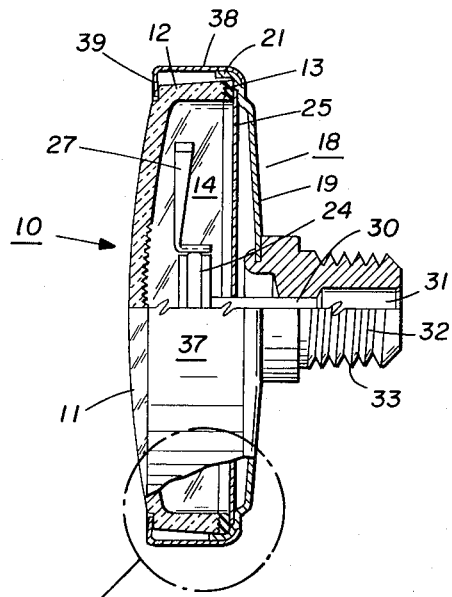
FIG. 2 is a side elevation partially in section.
Figure 3:
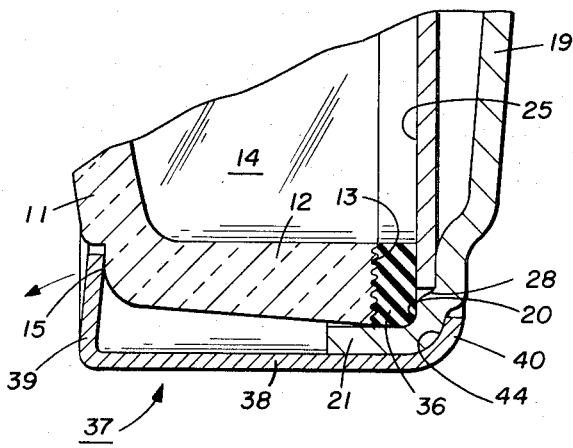
FIG. 3 is an enlarged fragmentary view of the encircled portion of FIG. 2 in its normal unventing relation.

Referring now to the drawings, the casing assembly in accordance herewith includes a transparent crystal or window 10 formed as a generally cylindrical cup-shaped molded unit of relatively high temperature thermoplastic such as polycarbonate having dimensional stability at temperatures to on the order of at least 250°F. Comprising the unitary structure of crystal 10 is front face 11 merging integrally with annular side wall 12 which terminates rearwardly in a radial serrated flange 13. Beneath the crystal, there is defined a generally open cavity 14 while peripherally about front face 11 there is defined a radial flat 15 for reasons as will be described.

For receiving crystal 10 in an axial interfit therewith, there is included a cup-shaped, shell-like case 18 of a relatively thin gauge metal such as stainless steel. Comprising case 18, is a generally radially concave back wall 19 merging into an annular flat forming the backside of radial ledge 20. Radially beyond ledge 20 the case bends axially to its termination at 21 to define an open face closely surrounding received end flange 13 of crystal 10 whereby the crystal and case together cooperate for generally enclosing the working components of the instrument.

As here shown, the working components may, by way of example, be that of a pressure gauge intended to be responsive to variations of pressure conditions being sensed. For those purposes, there is provided a Bourdon tube 24 within the casing secured between crystal 10 and a dial plate 25 received in an annular central recess 28 so as to be visible through the crystal from the front of the instrument. The dial plate includes graduations 26 with which a pointer 27 attached to the Bourdon tube cooperates to indicate values of pressure received at the instrument. Pressures to be sensed thereby are received through an open end 30 of Bourdon tube 24 secured in a bore 31 of a socket 32. The socket in turn is centrally secured in rear wall 19 and is threaded at 33 for mounting into a threaded well suitably provided in the system in which it is to be installed.

To effect the seal and vent structure in accordance herewith, an annular resilient gasket 36 of suitable resilient composition such as rubber or the like is positioned intervening between case ledge 20 and serrated flange 13 of crystal 10. Securing the components generally dusttight and watertight in the latter relation is achieved by means of an annular collar ring 37 biasing the crystal and casing axially toward each other and oppositely against gasket 36. Collar ring 37 is of metal such as stainless steel sufficiently thin to afford it a spring-like resilience. In order to function in the manner hereof the ring is shaped by bending or crimping into a U-channel configuration to form an annular side wall 38 merging with axially opposite radial flanges 39 and 40 in the front and rear, respectively. It is to be noted that flange 39 has a slightly greater radial extent than does flange 40.

Figure 4:
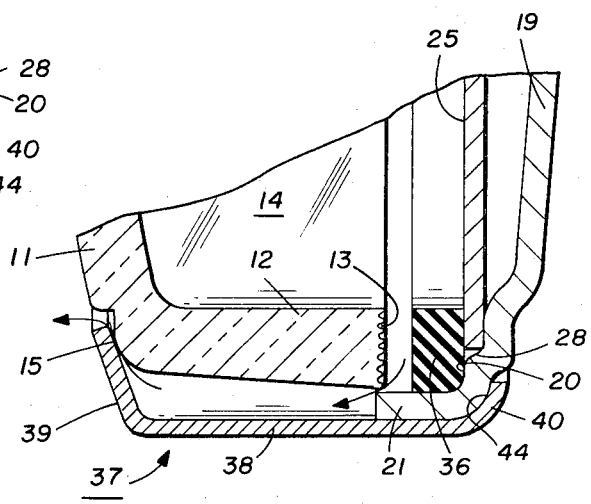
FIG. 4 is an enlarged fragmentary view of the encircled portion of FIG. 2 during its pressure venting relation.

For supporting the collar ring tensioned in its assembled biasing relation, the terminal end of flange 39 is adapted to seat against crystal flat 15 while flange 40 is received behind case wall 19 against radial surface 44. The extent of bending or crimping of ring 37 is sufficient for flanges 39 and 40 when engaging the crystal and casing to place the collar in tension urging them together in a relatively dustproof, waterproof relation about gasket 36. In the event of overpressure incurred within the assembly, a pressure buildup in cavity 14 increasingly acts against the inside surface of crystal face 11 urging the crystal away from gasket 36 in opposition to the axial biasing force being exerted by collar 37. On sufficient buildup of internal pressure to on the order of 5–90 psig., crystal 10 gradually displaces from gasket 36 in the manner best illustrated in FIG. 4 to define a gap 50 through which overpressure can escape about the crystal past ring flange 39. So long as the latter situation exists, pressure from within continues to be relieved as shown by the arrows in FIG. 4. When venting is completed, the inherent biasing force imposed by flange 39 restores the crystal to its former relation with gasket 36 immediately restoring the original water and dusttight seal relation of the components.

In operation, a gauge assembly as hereinbefore described is inserted in a system in which pressure is to be sensed. Under normal conditions of service, the casing assembly will provide a dust and watertight construction so as to maintain the internal working components clean and free of moisture. On an excess pressure being encountered within the casing, pressure acting axially against the inside surface of crystal face 11 causes the crystal to displace from the gasket enabling the required venting to occur.

From the above description there is disclosed an instrument casing assembly providing a novel safety construction for the venting of internal overpressure by combination of simple but effective features which lends itself to high volume production at minimum production cost. Not only, by virtue of simplicity with a minimum quantity of components, is the construction hereof regarded to be relatively inexpensive to produce as compared to similar purpose constructions of the prior art, but at the same time it lends itself to extremely small gauge design on the order of 1-inch and less that are normally difficult to manufacture. At the same time, a most important attribute is its compliance with the relatively more difficult criteria associated with standards recently imposed by Underwriters' Laboratories.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. An instrument casing assembly comprising in combination:
   a. a unitary generally cup-shaped transparent crystal having a radially extending front face integrally merging with an annular side wall;
   b. a cup-shaped, shell-like case having a radially extending back wall integrally merging with an annular side wall defining an open face in which to at least partially receive the side wall of said crystal in a peripherally surrounding axial interfit therewith;
   c. an annular resilient gasket positioned intervening between the end face of said crystal side wall and an internal radial surface portion of said case back wall thereat; and
   d. a generally resilient U-shaped annular collar ring axially extending to centrally surround said crystal and case in a tension relation therewith, said ring having axially spaced radial flanges one of which engages said crystal and the other of which engages said case to bias said case and crystal axially toward each other into sealing engagement with said gasket in the absence of internal overpressure while permitting axial displacement of said case and crystal for releasing said sealing engagement in the presence of a sufficient internal overpressure.

2. An instrument casing assembly according to claim 1 in which said collar ring is operative for releasing said sealing engagement in response to internal overpressure acting internally against the front face of said crystal at a magnitude sufficient to overcome the biasing force of said ring.

3. An instrument casing assembly according to claim 2 in which said collar ring is comprised of relatively thin metal stock capable of exerting a predetermined biasing force against said crystal and case.

4. An instrument casing assembly according to claim 3 in which said crystal is comprised of a relatively rigid thermoplastic composition having dimensional stability to at least 250°F.

5. An instrument casing assembly according to claim 4 in which the plastic composition of said crystal comprises polycarbonate.

6. An instrument casing assembly according to claim 4 in which the terminal end face of said crystal adapted to engage said gasket includes a serrated texture.

7. An instrument casing assembly according to claim 4 in which said front crystal face includes an annular recessed flat defined at the near periphery surface thereof for receiving said one ring flange.

8. An instrument casing assembly according to claim 7 in which said one ring flange is of relatively greater radial length than said other ring flange.

9. An instrument casing assembly according to claim 8 including a dial plate centrally positioned in said case at least partially intervening between said gasket and case back wall thereat.

10. An instrument casing assembly according to claim 9 in which the plastic composition of said crystal comprises polycarbonate.

* * * * *